United States Patent
Thomas

(12) 
(10) Patent No.: US 6,944,095 B2
(45) Date of Patent: Sep. 13, 2005

(54) TERRESTRIAL SEISMIC ACQUISITION PROCESS AND APPARATUS, IN PARTICULAR FOR A VERTICAL SEISMIC ACQUISITION

(75) Inventor: David Thomas, London (GB)

(73) Assignee: Baker Hughes Oil Field Operations, Inc., Houston, TX (US)

( * ) Notice: Subject to any disclaimer, the term of this patent is extended or adjusted under 35 U.S.C. 154(b) by 288 days.

(21) Appl. No.: 10/300,047

(22) Filed: Nov. 19, 2002

(65) Prior Publication Data

US 2003/0133361 A1 Jul. 17, 2003

(30) Foreign Application Priority Data

Nov. 23, 2001 (NL) .............................................. 1019427

(51) Int. Cl.⁷ ................................................ G01V 1/00
(52) U.S. Cl. .......................... 367/57; 367/23; 367/117; 181/111
(58) Field of Search ............................. 367/23, 56, 57, 367/117; 181/107, 111, 113

(56) References Cited

U.S. PATENT DOCUMENTS

| 3,022,851 A | * | 2/1962 | Hasbrook ..................... 367/55 |
| 3,472,334 A | * | 10/1969 | Snodgrass ..................... 367/61 |
| 4,047,591 A | * | 9/1977 | Ward et al. .................. 181/119 |
| 4,210,222 A | * | 7/1980 | Chelminski et al. ........ 181/107 |
| 4,868,794 A | * | 9/1989 | Ziolkowski et al. ........... 367/23 |
| 4,955,952 A | * | 9/1990 | Williams et al. ............. 181/111 |
| 5,105,391 A | * | 4/1992 | Rice et al. ..................... 367/58 |
| 5,184,329 A | * | 2/1993 | Regnault et al. ............... 367/23 |
| 5,742,560 A | * | 4/1998 | Krebs ............................ 367/57 |
| 6,382,332 B1 | * | 5/2002 | Eaton ............................ 175/50 |
| 6,419,044 B1 | * | 7/2002 | Tite et al. .................... 181/116 |

* cited by examiner

Primary Examiner—Thomas H. Tarcza
Assistant Examiner—Scott A. Hughes
(74) Attorney, Agent, or Firm—Duane Morris LLP

(57) ABSTRACT

A method for the acquisition of seismic signals, in which at least two sources of the air gun type are placed within one or more vertical holes extending in the subsoil and in which one or more seismic sensors record the seismic propagated from said sources, that arrive at said sensors either directly, or by being reflected by the interfaces between the various layers of the subsoil, characterised in that the triggering of the various sources is adjusted so that the various seismic signals generated by said sources are simultaneously received by at least one reference sensor which is placed in a vertical hole which extends at the vicinity of the hole(s) which receive(s) the sources or which is one of said holes.

14 Claims, 2 Drawing Sheets

TERRESTRIAL SEISMIC ACQUISITION PROCESS AND APPARATUS, IN PARTICULAR FOR A VERTICAL SEISMIC ACQUISITION

PRIORITY INFORMATION

This application claims the benefit of Netherlands application number 1019427, filed on Nov. 23, 2001.

FIELD OF INVENTION

The present invention relates to a technique for terrestrial seismic acquisition.

BACKGROUND OF THE INVENTION

It is usual in terrestrial (onshore) seismic techniques, and in particular in vertical seismic techniques, to use seismic sources of the air gun type which are often placed in shallow boreholes, typically of the order of 20 to 30 m in depth. Seismic energy from the source that is propagated through the earth is then detected and recorded by receivers positioned some distance away from the source. In the case of vertical seismic techniques, the receivers are positioned in a borehole such that they may be up to several thousand meters distant from the source with the objective of investigating the structure and properties of the subsurface.

It has already been proposed in order to have substantial seismic signals at the source to use a plurality of seismic sources in the neighbourhood of each other.

A problem that occurs with such an arrangement of sources is the accurate synchronisation of the individual source outputs.

When a source is deployed in a shallow borehole, it is not usual to be able to accurately determine its position. The extent of the uncertainty may be of the order of 1 or 2 meters horizontally and 1 meter vertically.

Further, the region of earth immediately local to each source can have differing properties from source to source position and from time to time such that the propagation of seismic energy through them also varies from source to source and time to time.

Such factors prevent the use of existing techniques usually used to control the synchronisation of the shots of the sources, since these require precise knowledge of the source locations, and assume uniformity in the region of the earth local to the sources.

The invention proposes a solution that permits a solution to these problems.

SUMMARY OF THE INVENTION

More precisely, a method is proposed for the acquisition of seismic signals, in which at least two sources of the air gun type are placed within one or more vertical holes extending in the subsoil.

According to this method the triggering of the various sources is adjusted so that the various seismic signals generated by said sources are simultaneously received by at least one reference sensor, which is placed in a vertical hole that extends in the vicinity of the hole(s) that receive the sources or is in one of said holes.

Said reference sensor is preferably placed at a depth below the surface which is deeper than that of the seismic sources such that it intercepts the principal seismic energy travel path in the direction of the subsurface that is being investigated through seismic techniques.

Advantage can be gained through using a plurality of sources distributed in the same hole, one under another.

Advantage can be gained through using a plurality of vertical holes, a reference sensor being placed in a vertical hole in the region of and preferably between the various holes receiving the seismic sources.

In particular, seismic sources can be placed in two vertical holes, a reference sensor being placed in a vertical hole extending midway between these two holes.

By placing the reference sensor at a vertical depth below that of the seismic sources sufficiently greater than the lateral distance from them, the reference sensor can be considered as sensing the energy propagating vertically down from the sources. Therefore, the reference sensor signal can be used to monitor and control the synchronisation of the source energy in the vertical direction.

Additionally, by deliberately offsetting the position of a reference sensor hole from the mid-point between the source holes, a reference sensor can be used to monitor and control the synchronisation of the sources' signals in other directions.

The invention also concerns the use of a device for said proposed method.

In particular, it proposes a device for use in the acquisition of seismic signals generated by at least two sources of the air gun type distributed in one or a plurality of vertical holes extending in the subsoil, and comprising one or a plurality of sensors which record the seismic signals propagated from said sources that arrive at said sensors' various locations, either directly, or by being reflected by the interfaces between the various layers of said subsoil, characterised in that it comprises a control unit which controls the triggering of the various sources and means adapted to permit the adjustment of said triggering so that the seismic signals generated by said sources are simultaneously received by at least one reference sensor placed in a vertical hole which extends in the vicinity of the hole(s) which receive the sources, or which is one of said holes.

BRIEF DESCRIPTION OF THE DRAWINGS

Other features and advantages of the invention will be understood from the description that follows, whose purpose is intended to be illustrative and not to be limiting and which is to be understood in conjunction with the drawings appended, in which.

BRIEF DESCRIPTION OF AN EMBODIMENT OF THE INVENTION

Figure 1:
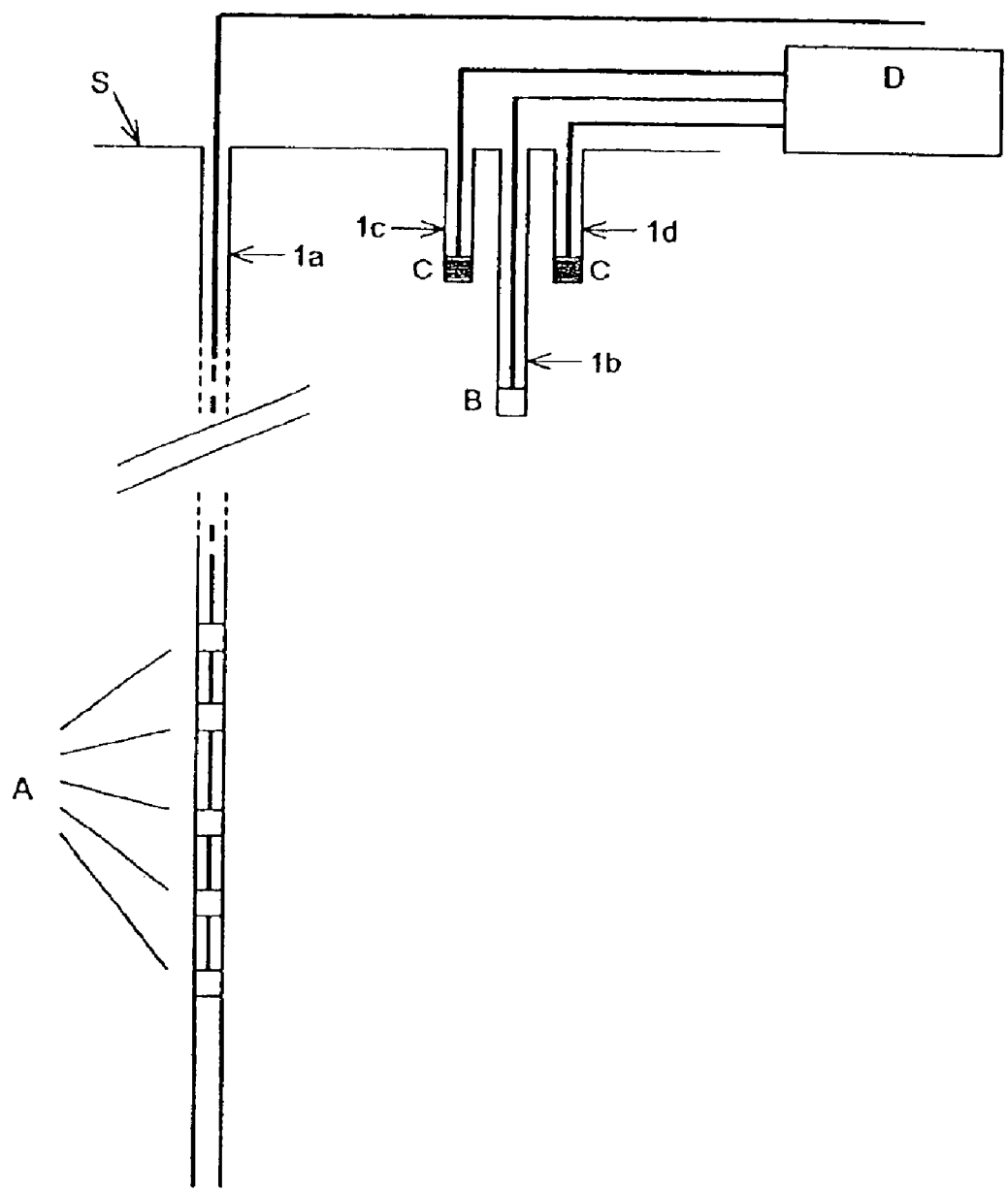
FIG. 1 illustrates one possible implementation of the invention

In the example in FIG. 1 three vertical holes 1*a*, 1*b*, 1*c*, 1*d* are shown. The holes all lie in the same vertical plane.

Vertical hole 1*a* is a borehole typical of those used in hydrocarbon exploration and is, for example, several thousand meters deep. A seismic sensor or plurality of sensors, A, for example of the geophone or hydrophone type, is deployed at a variety of depths in hole 1a, for example, the depths may range from 300 to 3000 meters.

Vertical hole 1b is spaced 50 m from hole 1a and is used to deploy a reference sensor B at a depth of 50 m relative to the surface, S.

Vertical holes 1c and 1d are a distance of 5 m either side of hole 1b and are used to deploy seismic sources, C, at a depth of 20 m relative to the surface, S.

The reference sensor, B, and seismic sources, C, are linked to a control unit, 0, which controls the firing of said sources, and controls their respective triggering times in response to said control unit receiving a shooting order.

To adjust the synchronisation of said sources, it is foreseen that, once the sources C are in place inside the holes 1c and 1d, and prior to acquisition of data from sensors A, the control signals that trigger the sources C are adjusted by control unit 0 so that the time that expires between a shooting order and the time at which the down-going waves emitted from said sources are received by said reference sensor B is the same for each source.

In this way, in response to a general shooting order, the down going waves from each of the said sources reach the reference sensor at the same time. The waves are superimposed on each other in a constructive manner and after propagation through the sub surface are received by the various sensors A as a single wave of high amplitude, therefore enhancing the signal to noise ratio of the recorded data.

The adjustment of the triggering delays can be performed by an automatic synchronisation sequence in which each seismic source C is individually triggered, and the time that expires from the trigger signal being sent to each seismic source C to the energy from it being detected by the reference sensor B is measured for each seismic source. These times are then used to automatically adjust the triggering delays for each seismic source C so that when the control unit 0 receives a general firing order the desired coincident energy arrival at the reference sensor B is achieved.

In operation the synchronisation can be performed frequently to check for and minimise possible timing drifts.

Figure 2:
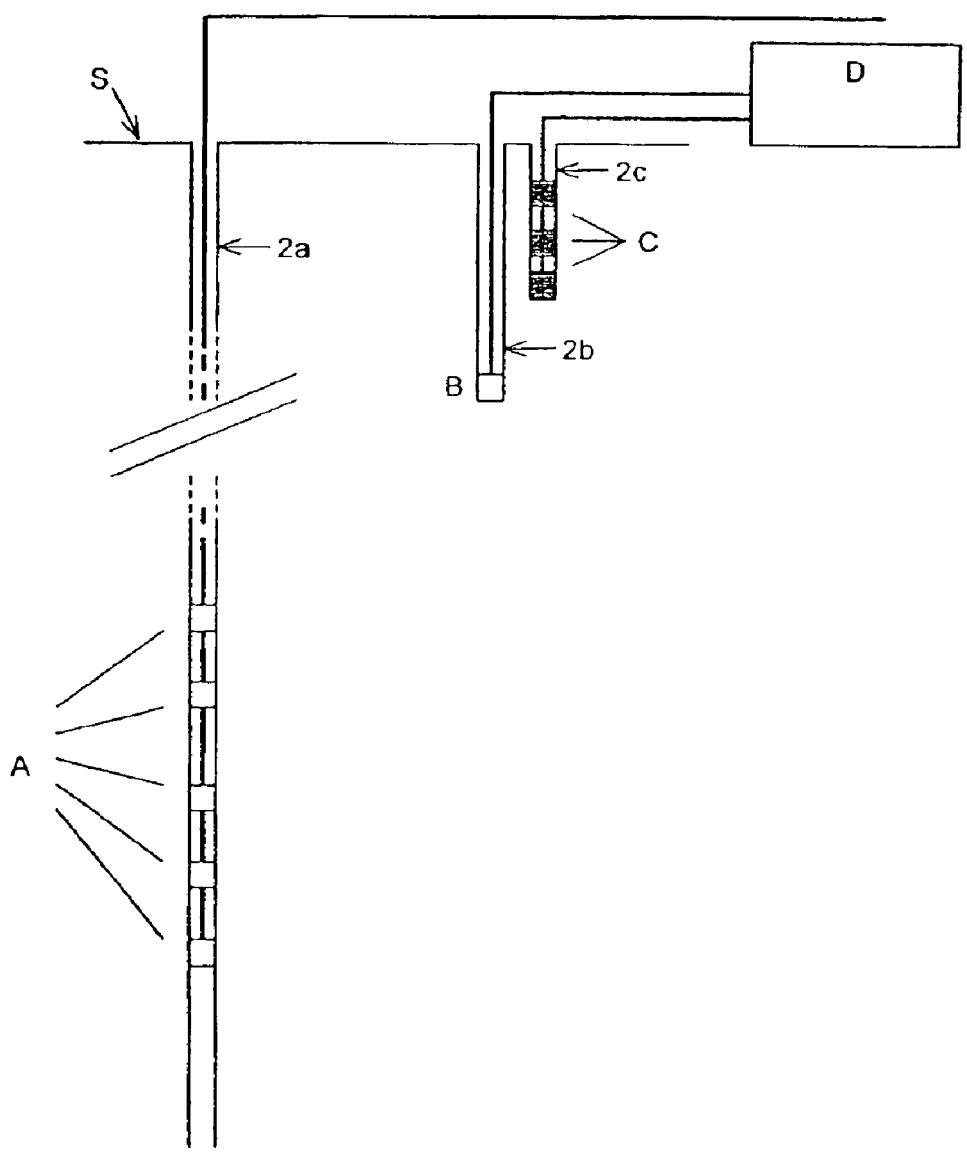
FIG. 2 illustrates another possible implementation

In the implementation that is illustrated in FIG. 2, vertical holes 2a and 2b, similar to 1a and 1b in FIG. 1, are illustrated. Also illustrated is a plurality of sources, C, with the sources placed one above the other, all in the same vertical hole 2c.

Said sources are synchronised using the same principle as that illustrated by FIG. 1: they are controlled by control unit D so that the seismic energy that they each generate that reaches the reference sensor B is coincident.

Other embodiments and implementations can be contemplated.

In particular, it can be contemplated that a reference sensor is placed at a depth relative to the Earth that is less than the depth of the seismic sources. However, embodiments in which the reference sensor(s) is (are) placed beneath the sources are preferred since said sensors are then in the path of the down-going energy traveling into the sub surface.

Further, a reference sensor can be placed in the same hole as used to deploy a single or plurality of seismic sources.

Also it can be contemplated using a plurality of reference sensors and not just one.

In addition, it can be contemplated that the reference sensor(s) may be positioned such that the combined energy from the seismic sources is synchronised in a direction other than the region vertically below the sources.

Further, as will have been understood, the implementations that have been proposed suppose that the seismic reference sensor is sufficiently away from the seismic sources so that one can consider the energy travel path from each source to the said reference sensor to adequately approximate to being parallel.

In practice, in the case of using the seismic sources to investigate the subsurface in the region vertically below their location, the reference sensor needs to be placed at a depth at least two or three times the lateral spacing between the reference monitor hole and those receiving one or more seismic sources.

I claim:

1. A method for the acquisition of seismic signals, in which at least two seismic sources of the air gun type are placed within one or more vertical holes extending in subsoil and in which one or more seismic sensors record seismic signals, propagated from said sources, that arrive at said seismic sensors either directly or by being reflected by the interfaces between the various layers of the subsoil, characterised in that the triggering of the various sources is adjusted so that the various seismic signals generated by said sources are simultaneously received by at least one reference sensor which is placed in a vertical hole which extends at the vicinity of the hole(s) which receive(s) the sources or which is one of said holes.

2. Method according to claim 1, characterised in that the reference seismic sensor is placed at a depth of the subsoil which is deeper than that of the seismic source(s).

3. Method according to claim 1, characterised in that a plurality of seismic sources are distributed in the same hole, one under the other.

4. Method according to claim 1, characterised in that the triggering of the sources is synchronised so that the down-going wave for each of said sources is received 50 µs after a shooting order.

5. Method according to claim 1, characterised in that the seismic sources are placed in a plurality of vertical holes and in that a reference sensor is placed in a vertical hole extending in the vicinity of the various holes receiving the seismic sources.

6. Method according to claim 5, characterised in that a reference sensor is placed in a vertical hole extending between the various holes receiving the seismic sources.

7. Method according to claim 6, characterised in that the seismic sources are placed in two vertical holes and in that a reference sensor is placed in a vertical hole extending midway between these two holes.

8. Method according to claim 1, characterised in that the position of the hole in which the reference sensor is located is offset from a midpoint between the source holes, so that a synchronisation of the seismic sources is controlled in a direction other than vertical.

9. Device for use in the acquisition of seismic signals generated by at least two seismic sources of the air gun type distributed in one or a plurality of vertical holes extending in subsoil, and comprising one or a plurality of sensors which record seismic signals propagated from said seismic sources that arrive at said sensors' various locations, either directly or by being reflected by the interfaces between the various layers of said subsoil, characterised in that it comprises a control unit which controls triggering of the various sources and means adapted to permit the adjustment of said triggering so that the seismic signals generated by said sources are simultaneously received by at least one reference sensor placed in a vertical hole which extends in the vicinity of the hole(s) which receive(s) the sources, or which is in one of said holes.

10. Device according to claim 9, characterised in that the reference sensor is placed in the subsoil at a higher depth than that of the acoustic source(s).

11. Device according to claim 9, characterised in that a plurality of seismic sources are placed in a superposed disposition in a same hole.

12. Device according to claim 9, characterised in that the sources are placed in a plurality of vertical holes and in that a reference sensor is placed in a vertical hole which extends between the different holes which receive the sources.

13. Device according to claim 12, characterised in that the sources are placed in two vertical holes and in that a reference sensor is placed in a vertical hole which extends midway between these two holes.

14. Device according to claim 9, characterised in that a reference sensor is placed in a vertical hole which is offset from the midpoint between the source holes, in such a manner that a synchronization of the sources is controlled in a direction other than vertical.

* * * * *